United States Patent
Kim

(10) Patent No.: US 12,493,946 B2
(45) Date of Patent: Dec. 9, 2025

(54) APPARATUS AND METHOD FOR VERIFYING OPTICAL FIBER WORK USING ARTIFICIAL INTELLIGENCE

(71) Applicant: FIBERFOX, INC., Daejeon (KR)

(72) Inventor: Won Young Kim, Daejeon (KR)

(73) Assignee: FIBERFOX, INC. (KR)

( * ) Notice: Subject to any disclaimer, the term of this patent is extended or adjusted under 35 U.S.C. 154(b) by 478 days.

(21) Appl. No.: 17/898,439

(22) Filed: Aug. 29, 2022

(65) Prior Publication Data
US 2024/0062359 A1 Feb. 22, 2024

(30) Foreign Application Priority Data
Aug. 16, 2022 (KR) .......................... 10-2022-0102332

(51) Int. Cl.
| | | |
|---|---|---|
| G06T 7/00 | (2017.01) | |
| G06T 3/40 | (2006.01) | |
| G06T 7/11 | (2017.01) | |
| G06T 7/60 | (2017.01) | |
| G06V 10/12 | (2022.01) | |
| G06V 10/22 | (2022.01) | |

(52) U.S. Cl.
CPC .............. *G06T 7/0008* (2013.01); *G06T 3/40* (2013.01); *G06T 7/001* (2013.01); *G06T 7/11* (2017.01); *G06T 7/60* (2013.01); *G06V 10/12* (2022.01); *G06V 10/22* (2022.01); *G06T 2207/20132* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 4,978,201 A | 12/1990 | Yamada et al. | |
| 6,888,957 B1 | 5/2005 | Kim et al. | |
| 12,026,869 B2 * | 7/2024 | Onishi | G06T 7/001 |
| 2017/0197302 A1 * | 7/2017 | Kobayashi | G06T 7/0008 |
| 2021/0295532 A1 * | 9/2021 | Lee | G06F 18/22 |

(Continued)

FOREIGN PATENT DOCUMENTS

| | | |
|---|---|---|
| CN | 113344862 A | 9/2021 |
| CN | 114049320 A * | 2/2022 |

(Continued)

OTHER PUBLICATIONS

Aslam, Y., N., S., Ramasamy, N., & Ramar, K. (2019). An Effective Surface Defect Detection Method Using Adaptive Thresholding Fused with PSO Algorithm. International journal of simulation: systems, science & technology, 19.*

(Continued)

*Primary Examiner* — Andrew W Bee
*Assistant Examiner* — Christine Zhao
(74) *Attorney, Agent, or Firm* — Renaissance IP Law Group LLP

(57) ABSTRACT

A verification apparatus is provided. The verification apparatus includes: an acquisition unit configured to acquire a photographed image of an optical line for which a splicing operation is completed; an analysis unit configured to extract a defect of a spliced portion of the optical line through analysis of the image; and a determination unit configured to determine the presence or absence of an abnormality in the spliced portion based on the extracted defect.

13 Claims, 17 Drawing Sheets

(56) References Cited

U.S. PATENT DOCUMENTS

| | | | | |
|---|---|---|---|---|
| 2023/0005119 A1* | 1/2023 | Kurasawa | .............. | G06V 20/70 |
| 2023/0326008 A1* | 10/2023 | Terahai | ................... | G06T 7/001 |
| | | | | 382/141 |
| 2023/0333547 A1* | 10/2023 | Poh | .................. | G06Q 10/06395 |
| 2023/0367445 A1* | 11/2023 | Bendall | ................... | G06T 11/00 |

FOREIGN PATENT DOCUMENTS

| | | | | |
|---|---|---|---|---|
| JP | 5863190 B2 * | 2/2016 | | |
| KR | 101995396 B1 | 9/2019 | | |
| KR | 20220054930 A | 5/2022 | | |
| KR | 20220086033 A | 6/2022 | | |
| WO | WO-2016146887 A1 * | 9/2016 | ............. | B65D 88/12 |
| WO | 2021039546 A1 | 3/2021 | | |
| WO | 2021210546 A1 | 10/2021 | | |
| WO | WO-2021230115 A1 * | 11/2021 | ............... | G02B 6/25 |
| WO | 2022022288 A1 | 2/2022 | | |

OTHER PUBLICATIONS

European Extended Search Report for Application No. 22193849.1, mailed Sep. 4, 2023.

* cited by examiner

*FIG. 13* e1 → 16
e2 → 26
e3 → 32
e4 → 26
e5 → 12
e6 → 28
e7 → 0
e8 → 20

APPARATUS AND METHOD FOR VERIFYING OPTICAL FIBER WORK USING ARTIFICIAL INTELLIGENCE

CROSS-REFERENCE TO RELATED APPLICATION

This application claims priority to and the benefit of Korean Patent Application No. 10-2022-0102332 filed in the Korean Intellectual Property Office on Aug. 16, 2022, the entire contents of which are incorporated herein by reference.

BACKGROUND

1. Field

The present disclosure relates to an apparatus and method for inspecting and verifying a spliced portion in a state where separate optical fibers are spliced together.

2. Description of the Related Art

A splicing operation of connecting separate optical fibers to form one optical line may be performed.

When the state of the optical fibers spliced through the splicing operation is abnormal, communication through the corresponding optical line may be difficult. In this case, rework is required, and it is desirable that the instructions for the rework be done promptly before the worker leaves the job site. For this purpose, a system capable of determining the fusion-spliced state of optical fiber by using information (splice loss rate, splice result image, etc.) of the optical fiber splicing point during splicing is required.

SUMMARY

In view of the above, the present disclosure provides a verification apparatus and a verification method capable of reliably determining the presence or absence of an abnormality in a spliced portion of an optical line where a splicing operation has been performed.

A verification apparatus in accordance with one embodiment of the present disclosure may include: an acquisition unit configured to acquire a photographed image of an optical line for which a splicing operation is completed; an analysis unit configured to extract a defect of a spliced portion of the optical line through analysis of the image; and a determination unit configured to determine the presence or absence of an abnormality in the spliced portion based on the extracted defect.

The analysis unit may analyze a similarity between each of defect images stored by type in a database and the image acquired by the acquisition unit.

The determination unit may determine the presence or absence of an abnormality in the spliced portion by using a plurality of similarities analyzed by type.

When different set ranges are set for each type of defect, the determination unit may determine whether the similarity analyzed for each type satisfies a set range for the corresponding type.

The determination unit may determine the spliced portion as normal only when the similarities analyzed by type satisfies the set ranges for each type, respectively.

The determination unit may analyze a correlation between a plurality of similarities analyzed by type using deep learning.

The determination unit may determine the presence or absence of an abnormality in the spliced portion based on the correlation.

In the verification apparatus of the present disclosure, a work server formed separately from a splicer for performing the splicing operation for the optical line may be provided.

An acquisition unit, an analysis unit, and a determination unit may be provided in the work server.

The acquisition unit may obtain splice data including a photographed image of the optical line for which the splicing operation is completed from the splicer.

The analysis unit may analyze the splice data.

The determination unit may determine the presence or absence of an abnormality in the spliced portion of the optical line by using the analysis result of the splice data.

The determination unit may transmit a rework message instructing rework to a terminal of a worker who operates the splicer or the splicer when the spliced portion is determined as abnormal.

When it is determined that the spliced portion is normal, the determination unit may transmit a completion message indicating completion of the splicing operation to a management server that manages the optical line.

A verification method in accordance with one embodiment of the present disclosure may include: an acquisition step of acquiring a photographed image of an optical line for which a splicing operation is completed; an analysis step of extracting defects of the spliced portion of the optical line by type through analysis of the image; and a determination step of determining the presence or absence of an abnormality in the spliced portion based on a correlation between the defects extracted by type.

The verification apparatus of the present disclosure can determine the presence or absence of an abnormality in the spliced portion through analysis of the image in which the spliced portion is photographed.

The determining the presence or absence of an abnormality in the spliced portion through image analysis may seem simple, but it is actually not simple.

This is because, when separate optical fibers are spliced together through thermal fusion or the like, various defects inevitably occur. Accordingly, when it is determined the presence or absence of an abnormality in the spliced portion based on the simple presence or absence of a defect, all optical lines for which the splicing operation has been performed may have abnormality and may be subject to rework.

Accordingly, it is necessary to determine that the spliced portion or the optical line having a defect to a degree that allows substantial communication is normal. In this case, an issue of determining which defect needs to be treated as normal may arise. The diameter of the optical fiber is difficult for a field worker to visually check. Of course, the worker may photograph and enlarge an image of the spliced portion through a separate photographing means, and check the enlarged photographed image in the field. However, it is still difficult for the worker to determine whether a specific defect is treated as normal or abnormal through analysis of the image.

In order to determine the presence or absence of an abnormality in the spliced portion, a method of transmitting a test signal through the optical line on which the splicing operation is performed may be considered. When the transmission and reception of the test signal is normally performed, the splicing operation of the corresponding optical line may be determined as normal. When the transmission and reception of the test signal is abnormally performed, the splicing operation of the corresponding optical line may be determined to be abnormal, and a rework instruction may be transmitted to the worker.

However, since the worker of the splicing operation cannot generate the test signal, it is necessary to request a manager of a management server that manages the optical line to perform transmission/reception of the test signal. It takes a lot of time to communicate with the manager, and as a result, the worker spends a lot of time on splicing and inspection. In addition, in an environment in which the worker of the splicing operation and the manager of the management server belong to different companies, it may be difficult to determine the presence or absence of an abnormality in the spliced portion using the test signal.

The verification apparatus of the present disclosure can extract defects by automatically analyzing the image, and determine the presence or absence of an abnormality in the spliced portion of the optical line by using the extracted defects in various ways. According to the present disclosure, on the premise that a defect already exists, a means for automatically determining whether the corresponding defect is at a level to be determined as abnormality of the spliced portion may be provided. The means may be installed in the splicer itself or may be provided in a separate job server.

In order to determine the presence or absence of an abnormality in the spliced portion related to communication reliability based on the defect included in the image, the verification apparatus may analyze the current defect state from various angles.

For example, the verification apparatus of the present disclosure may classify defects that may occur in the spliced portion by type. The verification apparatus may compare the current defect of the spliced portion with existing defects stored by type and calculate the similarity. In this case, the similarity may be calculated for each type of defect. When a normal environment in which transmission/reception of the test signal is normally performed is defined, a plurality of similarities calculated by type may have a correlation to satisfy the normal environment.

The verification apparatus of the present disclosure may determine the correlation through machine learning or the like, and determine the presence or absence of an abnormality in the spliced portion using the correlation.

When the spliced portion is determined as abnormal, the verification apparatus may instruct the worker to rework through the splicer or terminal being used by the worker. When the spliced portion is determined as normal, the verification apparatus may transmit the fact that the splicing operation is completed to the management server. If necessary, the management server may perform additional self-inspection through transmission/reception of the test signal.

According to the present disclosure, it is possible to automatically determine the presence or absence of an abnormality in a spliced portion which guarantees normal communication with respect to the spliced portion including a defect in a work stage or a work server stage, not a management server stage.

Since the worker receives the rework instruction from the verification apparatus rather than the management server, rework can be started quickly.

From the point of view of the management server, since it is only necessary to transmit and receive the test signal for the optical line for which the primary verification has been completed by the verification apparatus, the time required for self-inspection can be greatly reduced.

According to the present disclosure, through the application installed on the worker's terminal, the terminal can communicate with the splicer for fusing the optical fiber. The terminal may obtain the splice data from the splicer and transmit the splice data to the work server. The terminal may include a mobile communication terminal such as a smartphone carried by the worker. The mobile communication terminal may be provided with a communication means capable of communicating with the remote work server and communicating with the short-distance splicer. The splice data may be displayed through the work terminal and transmitted to the work server at the same time.

For example, the splicer may transmit splice data to the terminal using Bluetooth Low Energy (BLE). The terminal may transmit the splice data to the cloud-based work server using its own communication means.

BRIEF DESCRIPTION OF THE DRAWINGS

FIG. 13 is a schematic diagram illustrating a defect extracted by the analysis unit.

DETAILED DESCRIPTION

Figure 1:
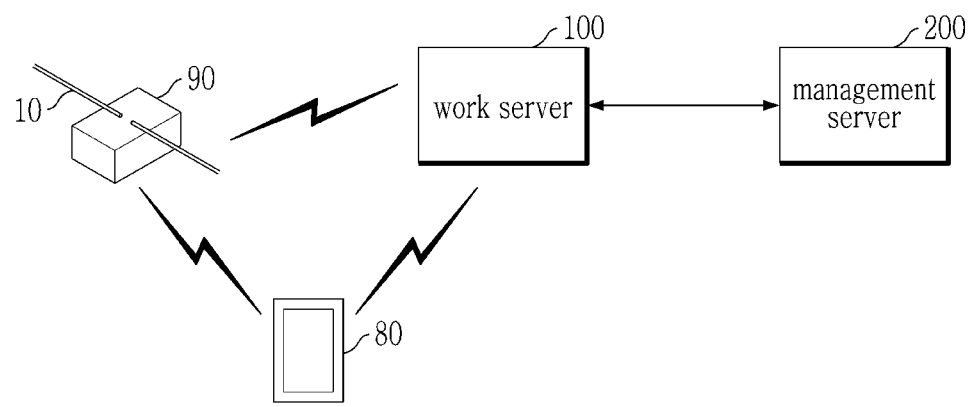
FIG. 1 is a schematic diagram showing a verification apparatus according to one embodiment of the present disclosure.

Hereinafter, with reference to the accompanying drawings, embodiments of the present disclosure will be described in detail so that those of ordinary skill in the art to which the present disclosure pertains can easily implement them. However, the present disclosure may be embodied in various different forms and is not limited to the embodiments described herein. Further, parts irrelevant to the description are omitted in the drawings to clearly illustrate the present disclosure, and similar reference numerals are given to similar parts throughout the specification.

In the present specification, redundant descriptions of the same components will be omitted.

In addition, in the present specification, when a component is referred to as being 'coupled' or 'connected' to another component, the component may be directly coupled or connected to another component, but it should be understood that a third component may exist therebetween. On the other hand, in the present specification, when it is mentioned that a component is 'directly coupled' or 'directly connected' to another element, it should be understood that no component exists therebetween.

In addition, the terms used herein are used only to describe specific embodiments, and are not intended to limit the present disclosure.

In addition, in the present specification, singular expressions may include plural expressions unless the context clearly indicates otherwise.

Further, in the present specification, it should be understood that terms such as 'comprise', 'include' or 'have' are only intended to designate that the feature, number, step, operation, component, part, or combination thereof described in the specification exist, and the existence or addition of one or more other features, numbers, steps, operations, components, parts or combinations thereof is not precluded in advance.

Furthermore, in the present specification, the term 'and/or' includes a combination of a plurality of listed items or any of a plurality of listed items. In the present specification, 'A and/or B' may include 'A', 'B', or 'both A and B'.

Moreover, in the present specification, detailed descriptions of well-known functions and configurations that may obscure the gist of the present disclosure will be omitted.

FIG. 1 is a schematic diagram showing a verification apparatus according to one embodiment of the present disclosure.

The verification apparatus shown in FIG. 1 may include a work server 100.

The work server 100 may communicate with a splicer 90, a terminal 80 of a worker, and a management server 200.

The splicer 90 may be used for splicing optical fibers.

The splicer 90 may be used for a stripping operation to remove coating of the optical fibers, a cleaving operation to cut ends of bare fiber 15 remaining after the removal of the coatings according to the standard, a splicing operation in which the ends of the bare fiber 15 of the optical fibers facing each other are heat-sealed and joined together, a reinforcement operation of overlaying a coating member on the bare fiber 15 exposed to the outside, and the like. The work server 100 may perform wired or wireless communication with the splicer 90 through a communication means provided in the splicer 90. The splicer 90 may directly transmit work information related to the splicing operation to the work server 100.

The splicer 90 may be manipulated by the worker, and the job server 100 may communicate with the worker's terminal 80 such as a smartphone or a personal computer used by the worker in wired or wireless communication. In this case, the worker's terminal 80 may obtain work information related to the splicing operation from the splicer 90, and transmit the corresponding work information to the job server 100.

The job server 100 may receive the work information related to the splicing operation from the splicer 90 or from the terminal 80 of the worker.

The management server 200 may provide a data transmission/reception service to consumers using the optical line 10. The management server 200 may be provided in a communications service provider that provides the optical line 10.

The communications service provider may perform the splicing operation of splicing a plurality of optical fibers together by itself or may request a separate company to perform the splicing operation. The work server may be independent of providing a communication service through the optical line 10. The work server may perform a management task such as scheduling a management work for connecting a plurality of optical fibers forming the optical line 10, and monitoring the management task.

The management server 200 needs to receive whether the splicing operation is completed before using the optical line 10 for which the splicing operation is required. The management server 200 preferably receives whether to complete the splicing operation from the work server rather than the splicer 90 or the terminal 80 of the worker. To this end, the work server may receive various information related to splicing work from the plurality of splicers 90 or terminals 80.

The work server capable of obtaining various information related to the splicing operation may additionally perform a verification operation for determining the presence or absence of an abnormality in the spliced portion. The work server may transmit the operation result to the management server 200 only when the spliced portion of the optical line 10 is determined as normal through the verification operation. When the work server determines that the spliced portion of the optical line 10 is abnormal through the verification operation, the work server may transmit a rework message instructing to perform the splicing operation again to the splicer 90 or the worker's terminal 80 splicing operation. In this case, the work server may not transmit the result determined as abnormal to the management server 200. According to the present embodiment, the management server 200 may not receive the abnormality determination result. Accordingly, the communication load of the management server 200 may be reduced. If necessary, the work server may additionally transmit the result determined as abnormal to the management server 200 as well as the result determined as normal.

Figure 2:
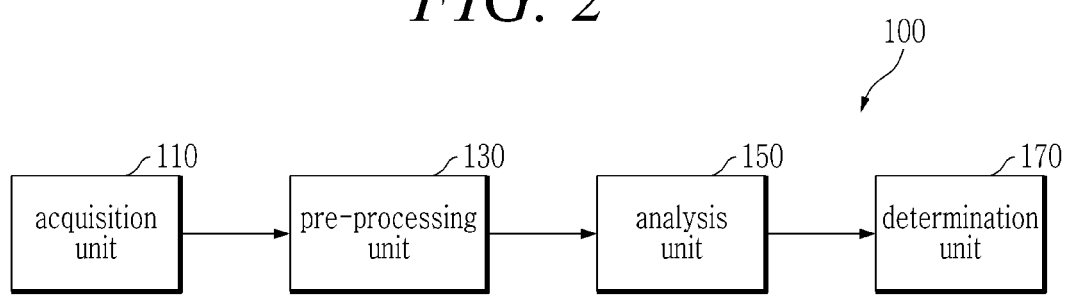
FIG. 2 is a block diagram illustrating a work server.

FIG. 2 is a block diagram illustrating the work server 100.

The work server 100 shown in FIG. 2 may include an acquisition unit 110, a pre-processing unit 130, an analysis unit 150, and a determination unit 170.

The acquisition unit 110 may acquire a photographed image of the optical line 10 for which the splicing operation is completed.

The pre-processing unit 130 may process the image acquired through the acquisition unit 110.

The analysis unit 150 may extract a defect of the spliced portion of the optical line 10 through analysis of the image.

The determination unit 170 may determine the presence or absence of an abnormality in the spliced portion based on the extracted defect.

The acquiring unit 110, the pre-processing unit 130, the analyzing unit 150, and the determination unit 170 may be provided in a server formed separately from the splicer 90 that performs the splicing operation, for example, the work server 100.

Figure 3:
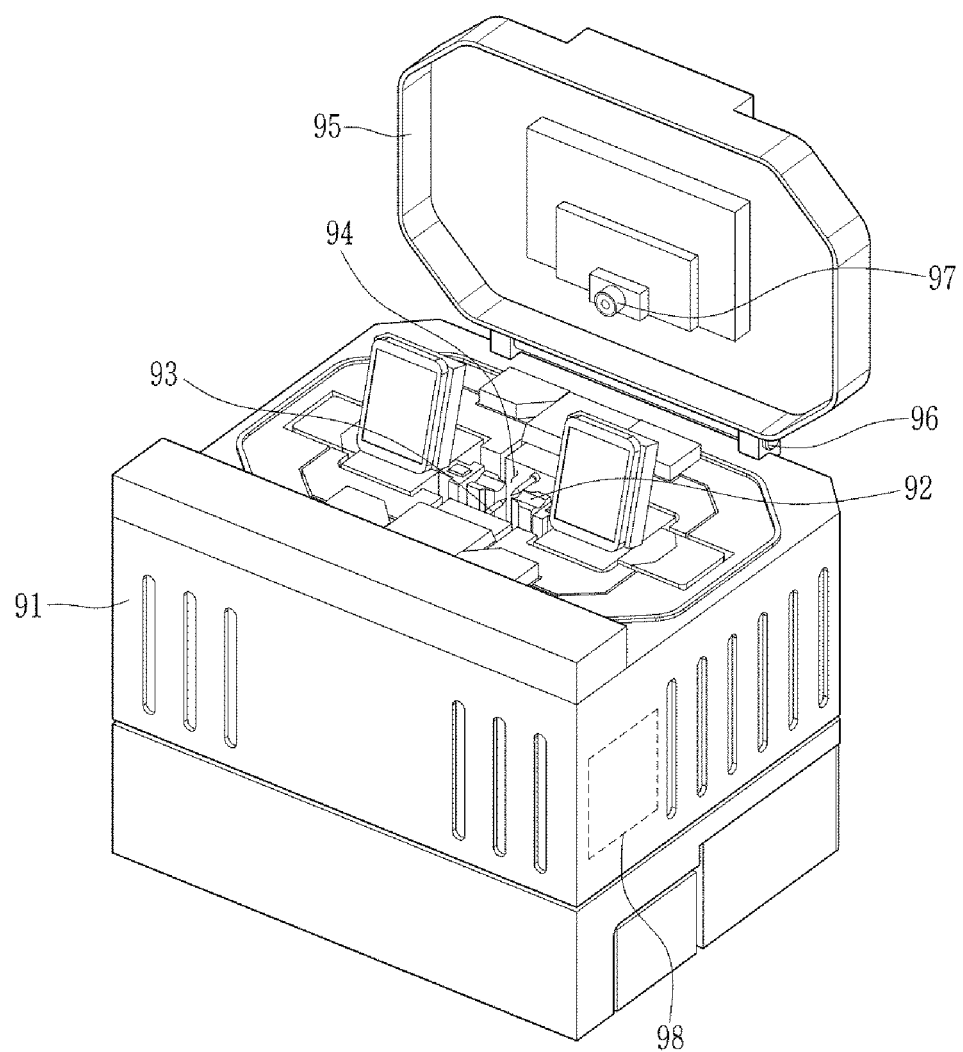
FIG. 3 is a schematic diagram showing a splicer.
Figure 4:
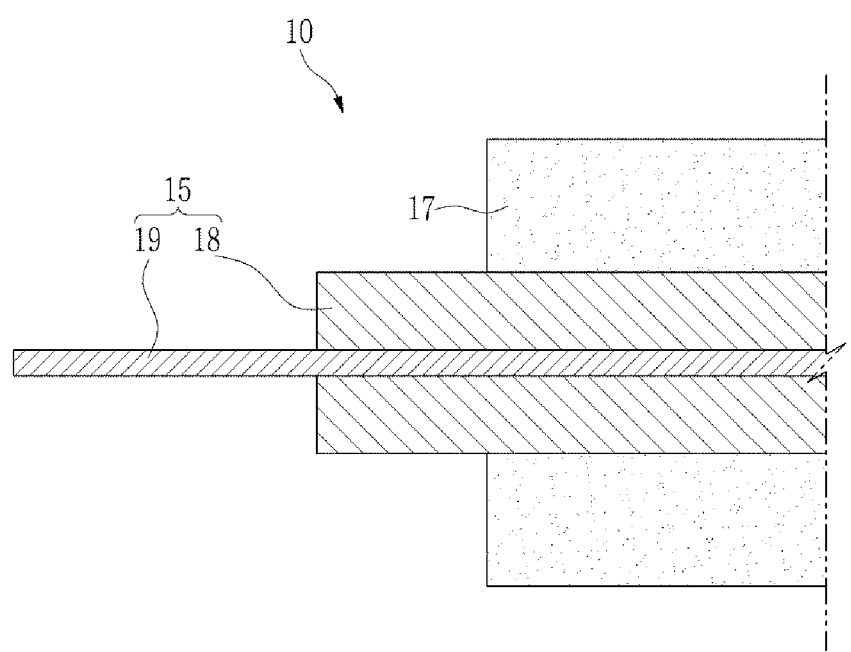
FIG. 4 is a cross-sectional view of an optical fiber forming an optical line.
Figure 5:
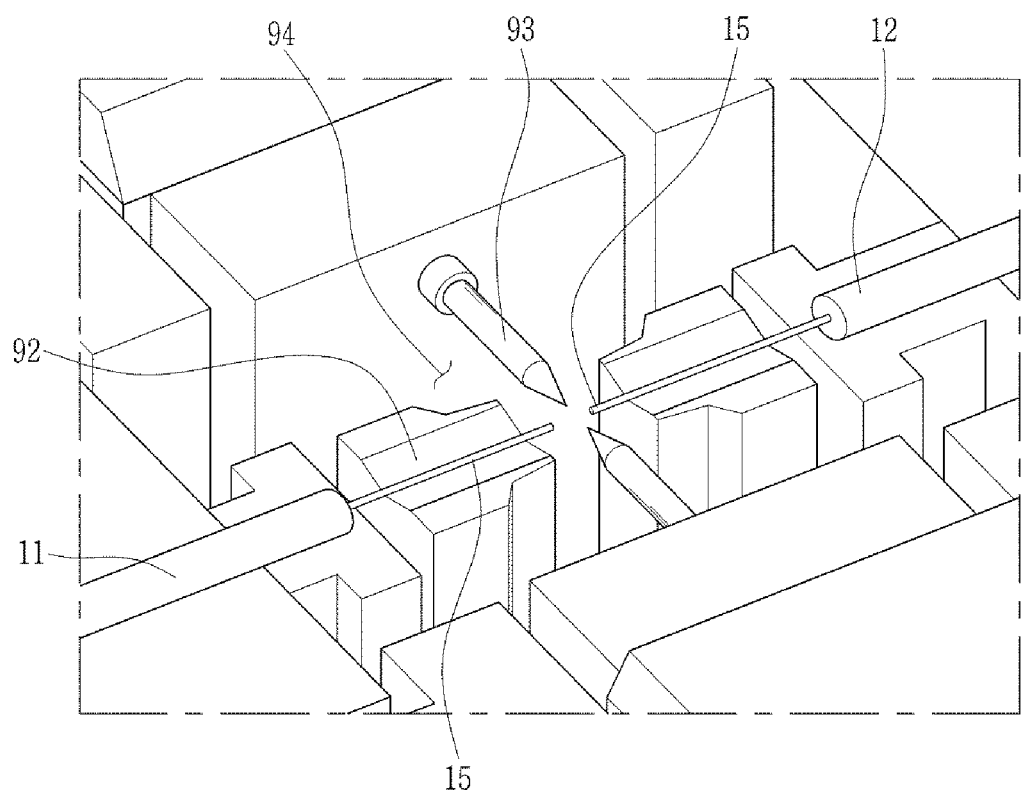
FIG. 5 is a schematic view showing a spliced portion.

FIG. 3 is a schematic diagram showing the splicer 90. FIG. 4 is a cross-sectional view of the optical fiber forming the optical line. FIG. 5 is a schematic view showing the spliced portion.

The splicer 90 may include a body part 91, a guide part 92, a splicing unit 93, a cover part 95, a photographing unit 97, and a providing unit 98.

The body part 91 may be formed in a three-dimensional shape. For example, the body part 91 may be formed in a hexahedral shape, a box shape, a cylindrical shape, etc. as a whole.

The guide part 92 and the splicing unit 93 may be formed on one surface of the body part 91. In some cases, a recessed receiving groove 94 may be formed in a center portion of one surface of the body 91. In this case, the guide part 92 and the splicing unit 93 may be disposed in the receiving groove 94.

The guide part 92 may align a first optical fiber 11 and a second optical fiber 12 so that the end of the first optical fiber 11 and the end of the second optical fiber 12 face each other.

The first optical fiber 11 may be aligned in the guide part 92 in a manner to approach the guide part 92 from one side of the body part 91. The second optical fiber 12 may be aligned in the guide part 92 in a manner to approach the guide part 92 from the other side of the body part 91. The first optical fiber 11 and the second optical fiber 12 approaching from different directions with respect to the body part 91 may be aligned to face each other in the center portion of one surface of the body part 9.

The guide part 92 may have a groove shape that becomes narrower in the direction of gravity so that the linear optical fibers are naturally aligned by their own weight. For example, a 'V'-shaped groove may be formed in the guide part 92. The first optical fiber 11 or the second optical fiber 12 may be seated in the groove formed in the guide part 92.

The splicing unit 93 may splice the end of the first optical fiber 11 and the end of the second optical fiber 12 aligned to face each other by the guide portion 92. For example, the splicing unit 93 may fusion-splice the end of the first optical fiber 11 and the end of the second optical fiber 12 together.

For example, the splicing unit 93 may include an electrode for generating an arc. When the first optical fiber 11 and the second optical fiber 12 are arranged along a first direction, two electrodes may be formed to extend along a second direction perpendicular to the first direction, and disposed to face each other with the ends of the optical fibers in between.

The splicing unit 93 can join optical lines into one while melting the ends of the optical lines by using the arc as a heat source.

The optical fiber forming the optical line may include a core 19 corresponding to a central portion through which light flows. The core 19 may correspond to a region that actually transmits light in the optical fiber.

The optical fiber may include a clad 18 corresponding to a junction area surrounding the core 19. The clad 18 may protect the surface of the core 19 and induce total internal reflection by using the difference in refractive index.

In the optical fiber, the core 19 and the clad 18 are main elements that allow light to flow, and the two will be collectively referred to as a bare fiber 15. The core 19 or the clad 18 may be formed of a quartz-based glass material.

In addition, the optical fiber may be additionally provided with a coating surrounding the clad 18, a cover surrounding the coating, and the like. The coating or the cover may be referred to as a jacket 17.

The ends of the first optical fiber 11 and the second optical fiber 12 seated on the guide part 92 may be in a state in which the jacket 17 is removed by a stripping operation and the bare fiber 15 is exposed to the outside.

The end of the bare fiber 15 of the first optical fiber 11 and the end of the bare fiber 15 of the second optical fiber 12 may be fusion-spliced by the splicing unit 93.

In the splicing process, the cover part 95 may be used to prevent foreign substances such as dust from entering between the ends of the bare fiber 15 and to protect the worker from heat, light, etc. generated during the splicing.

The cover part 95 may be rotatably installed at the body part 91, and may open or cover the guide part 92 and the splicing unit 93 through rotation. For example, the cover part 95 may be installed at the body part 91 in an opening/closing structure that rotates about a hinge 96 provided at one end of the body part 91.

The photographing unit 97 may be formed on one surface of the body part 91 facing an inner surface of the cover part 95 in a closed state in which the cover part 95 covers the guide part 92 and the splicing unit 93. Alternatively, the photographing unit 97 may be provided in the receiving groove 94 formed on one surface of the body part 91 facing the cover part 95. In some cases, the photographing unit 97 may be formed on an inner surface of the cover part 95 facing the splicing unit 93 in the closed state in which the cover part 95 covers the guide part 92 and the splicing unit 93. Meanwhile, an open state in which the closed state in which the cover part 95 covers the guide part 92 and the splicing unit 93 is released may be defined. In other words, the open state may mean a state in which the cover part 95 is opened with respect to the guide part 92 and the splicing unit 93.

The photographing unit 97 may include a camera for photographing the end of the first optical fiber 11 and the end of the second optical fiber 12, which become the spliced portion of the optical line 10, in the closed state or the open state.

The providing unit 98 may communicate with the acquiring unit 110 through a wired/wireless communication network. The acquisition unit 110 may receive the image of the spliced portion photographed by the photographing unit 97 from the providing unit 98.

In some cases, the providing unit 98 may communicate with the surrounding worker's terminal 80 instead of directly communicating with the acquiring unit 110. In this case, the worker's terminal 80 may receive the image of the spliced portion transmitted from the providing unit 98 and then transmit it to the acquisition unit 110. The worker's terminal 80 operates as a kind of repeater, and eventually, the providing unit 98 provides the image of the spliced portion to the acquiring unit 110 through a wired/wireless communication network.

The acquisition unit 110 may acquire an image of a first resolution. The corresponding image may be an image photographing the bare fiber 15 exposed to the outside which includes the core 19 and the clad 18 of the optical line 10. In addition, the corresponding image may include a spliced portion of the bare fiber 15.

Due to limitations of a memory and a storage built in the splicer 90, the image of the spliced portion photographed by the photographing unit 97 may have a low resolution such as 320×240. The corresponding low resolution may correspond to the first resolution.

The size of the feature that distinguishes the normal state and the abnormal state of the spliced portion is very small. For this reason, even if a similarity calculation technique using artificial intelligence is applied to the corresponding image, it is difficult to guarantee its accuracy.

Precautions need to be taken to clearly distinguish between normal and abnormal states in the image. The pre-processing unit 130 may be used for the corresponding precautions.

Figure 6:
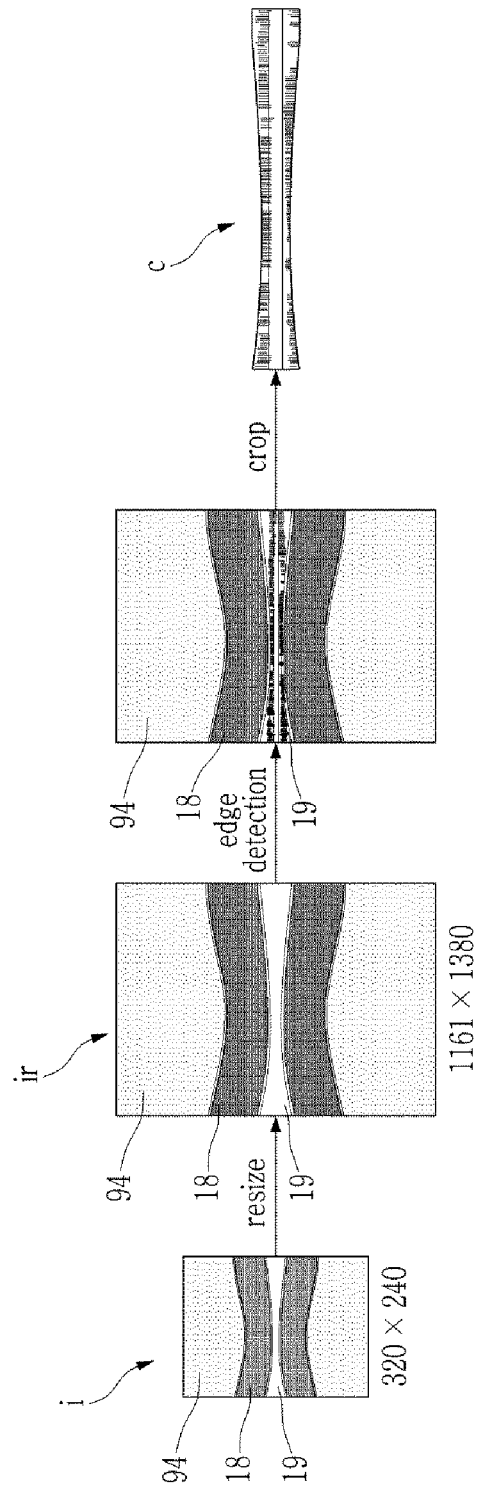
FIG. 6 is a schematic diagram showing an operation of a pre-processing unit.

FIG. 6 is a schematic diagram showing the operation of the pre-processing unit 130.

The pre-processing unit 130 may resize the image to a second resolution higher than the first resolution.

For example, the pre-processing unit 130 may resize an image i of 320×240 as shown in FIG. 6 to generate an image it of the higher second resolution, such as 1161×1380.

The pre-processing unit 130 may extract only a region of the core 19 in which the clad 18 is excluded from the image of the second resolution by applying an edge detection technique or the like.

The analysis unit 150 may analyze the region of the core 19 extracted by the pre-processing unit 130, and extract defects of the spliced portion through the analysis.

If necessary, the pre-processing unit 130 or the analysis unit 150 may generate an enlarged image c in which the spliced portion in the region of the core 19 is cropped and enlarged. The analysis unit 150 may extract a defect through analysis of the enlarged image c.

The Yolo network, an object recognition technology, may be used to extract and detect defects. However, even in the enlarged image c, there is a problem in that the size of the feature that distinguishes the abnormal state and the normal state is small to use the Yolo network. In order to solve the problem, the analysis unit 150 may generate a current hash value 'Image Hash' by applying a hash function 'Hash Function' to the image as shown in FIG. 7.

Figure 7:
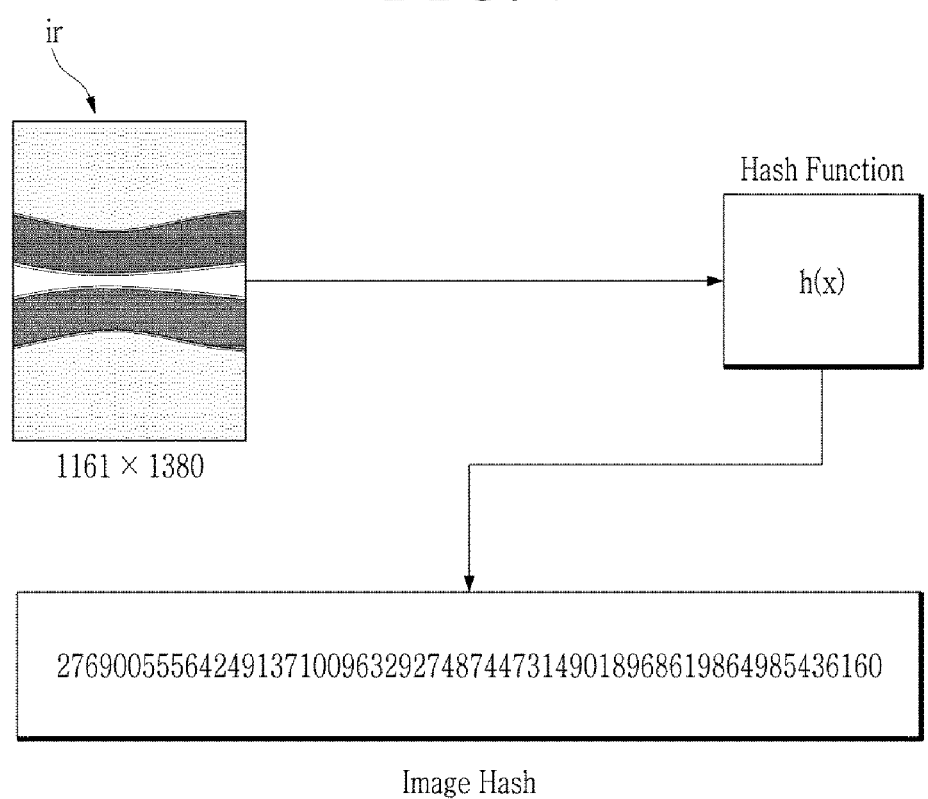
FIG. 7 is a schematic diagram illustrating an operation of an analysis unit.

FIG. 7 is a schematic diagram illustrating the operation of the analysis unit 150.

The analysis unit 150 may extract a defect in the spliced portion by comparing a defect hash value stored in a database with a current hash value.

The analysis unit 150 may calculate a similarity between the defect hash value and the current hash value through artificial intelligence.

A unique fingerprint may be generated based on the current hash value expressed as a number. A similarity with respect to a defect hash value may be calculated based on the fingerprint. However, in this case, there is a problem in that there is no clear standard for determining that the difference between the values from 0 to what number is to be the same. Such a problem is due to the fact that physical defects inevitably occur in most of the spliced portions where the splicing operation is performed.

The fusion-splicing between the bare fiber 15 may include a process of heating the ends of the bare fiber 15 to be molten. In this process, the end of the bare fiber 15 may be partially thermally deformed. Further, even though a process of aligning the end of the first optical fiber 11 and the end of the second optical fiber 12 is performed, some geometric errors may occur. For this reason, defects due to the thermal deformation or defects due to the geometric errors may exist in the bonding region.

Some of these defects may be determined as normal within a range that does not impair communication performance. In this case, in a state in which the specific defect is extracted through the analysis unit 150, an issue arises as to whether to determine the specific defect as normal or abnormal.

The determination of normality or abnormality may be determined according to the size of the defect, and may also be determined according to the type of defect. For example, the analysis unit 150 may analyze similarity between each of defect images stored by type in the database and an image acquired by the acquisition unit 110. The determination unit 170 may determine the presence or absence of an abnormality in the spliced portion using a plurality of similarities analyzed by type.

Figure 8:
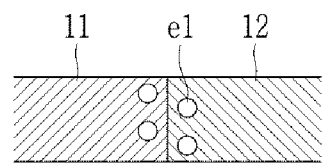
FIG. 8 is a schematic diagram showing a first type of defect.
Figure 9:
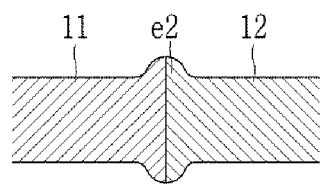
FIG. 9 is a schematic diagram showing a second type of defect.
Figure 10:
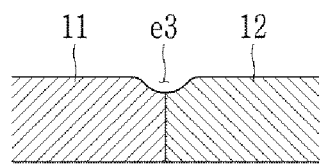
FIG. 10 is a schematic diagram showing a third type of defect.
Figure 11:
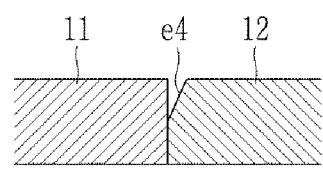
FIG. 11 is a schematic diagram showing a fourth type of defect.
Figure 12:
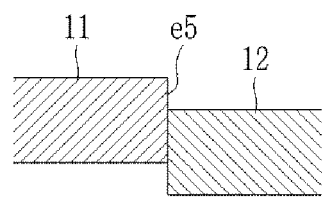
FIG. 12 is a schematic diagram showing a fifth type of defect.

FIG. 8 is a schematic diagram showing a first type of defect. FIG. 9 is a schematic diagram showing a second type of defect. FIG. 10 is a schematic diagram showing a third type of defect. FIG. 11 is a schematic diagram showing a fourth type of defect. FIG. 12 is a schematic diagram showing a fifth type of defect.

The types of defects may vary.

FIG. 8 shows a first type of defect e1 in which bubbles are included in the bare fiber 15 due to fusion.

FIG. 9 shows a second type of defect e2 in which the thickness of the spliced portion is thickened or the outer wall of the bare fiber 15 protrudes due to fusion.

FIG. 10 shows a third type of defect e3 in which the spliced portion is thinned or the outer wall of the bare fiber 15 is depressed due to fusion.

FIG. 11 shows a fourth type of defect e4 in which a part of the spliced portion is not spliced in fusion.

FIG. 12 shows a fifth type of defect e5 in which the bare fiber 15 of the first optical fiber 11 and the bare fiber 15 of the second optical fiber 12 are misaligned. Besides, various types of defects may be defined or classified.

Some types of defects, even small in size, may seriously interfere with normal communication. On the other hand, some types of defects may not significantly affect communication. In such a situation, it may be unreasonable to immediately determine the spliced portion as abnormal due to the extracted defect.

According to the verification apparatus, different set ranges may be set by type of defect.

The determination unit 170 may determine whether a similarity analyzed for each type satisfies a set range for the corresponding type.

The determination unit 170 may determine the spliced portion as normal only when the similarities analyzed by type satisfies the set ranges for each type, respectively.

Figure 13:
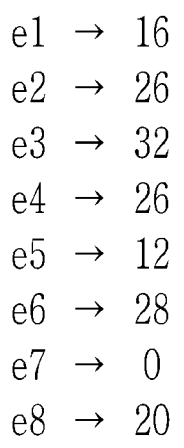

FIG. 13 is a schematic view illustrating defects extracted by the analysis unit 150. In the example of FIG. 13, the analysis unit 150 may analyze nine types of defects e1, e2, e3, e4, e5, e6, e7, e8, and e9.

The analysis unit 150 may compare defect hash values divided into 9 types with the current hash value. The analysis unit 150 may calculate a similarity between each of the defect hash values divided and stored by type and the current hash value. The results may be as shown in FIG. 13.

e1: 16
e2: 26
e3: 32
e4: 26
e5: 12
e6: 28
e7: 0
e8: 20

Depending on the expression method of the numerical value, it may be processed that the similarity between the current hash value and the defect hash value increases as the numerical value approaches 0. Conversely, it may be processed that the similarity between the current hash value and the defect hash value increases as the numerical value approaches a set value, e.g., 100.

In the above example, it is assumed that the similarity between the current hash value and the defect hash value increases as the value approaches 0.

Referring to the above figures, all 9 types of defects may be included in the spliced portion. However, the similarities for the respective types of defects have different numerical values.

In this case, different set ranges may be set for the respective types of defects.

For example, the set range of e1 may be set to 14 or more. The set range of e2 may be set to 20 or more. As a result of the analysis by the analysis unit 150, e1 is 16 and e2 is 26, so that the set ranges for each type of defect may be satisfied.

In this case, the determination unit 170 may determine that the spliced portion is normal.

If e1 is 13 as a result of the analysis by the analysis unit 150, the set range of e1 is not satisfied, so the determination unit 170 may determine the spliced portion as abnormal.

The above set range may be determined by an experimental result. The experimental result may be based on whether the communication test of the optical line 10 for which the splicing operation is completed has passed. Defects involved in total reflection of light may have complex correlations with each other.

For example, depending on the numerical value of a specific defect, the set range of other defects may vary. For example, e1 may be 50. The set range of e2 is 20 or more in the above example, but when e1 is 50, normal communication may be possible even when e2 is 10. Accordingly, when e1 is 50, the set range of e2 may be changed to 10 or more.

In summary, the determination unit 170 may analyze a correlation between a plurality of similarities analyzed by type.

The determination unit 170 may adjust the limit value of the set range for each type of defect by using the correlation. The determination unit 170 may determine the presence or absence of an abnormality in the spliced portion depending on whether the similarity analyzed for each type satisfies the set range for the corresponding type.

Figure 14:
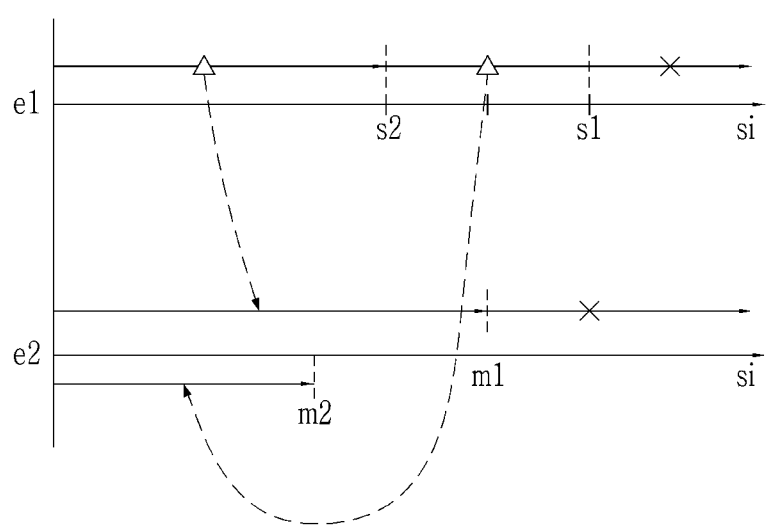
FIG. 14 is a schematic diagram showing an operation of a discrimination unit.

FIG. 14 is a schematic diagram showing the operation of the discrimination unit 170.

The analysis unit 150 may analyze a similarity si between each type of defect image and an image acquired by the acquisition unit 110.

For example, the analysis unit 150 may analyze a first similarity between the first type of defect image and the image acquired by the acquisition unit 110. In FIG. 14, the first type of defect is indicated by 'e1'. FIG. 14 may assume a state that the similarity increases as it approaches a specific value other than 0. The similarity appearing in the present embodiment may mean a similarity between the image acquired by the acquisition unit 110 and the defect image stored in the database. Therefore, a higher similarity may mean that the image of the spliced portion is similar to the defect image.

The analysis unit 150 may analyze a second similarity between the second type of defect image and the image acquired by the acquisition unit 110. In FIG. 14, the second type of defect is indicated by 'e2'.

When the first similarity satisfies a first set value s1, the determination unit 170 may determine the spliced portion as abnormal regardless of the second similarity. When the first type of defect e1 is large enough to cause a communication failure, it may be reasonable to determine the spliced portion as abnormal regardless of other types of defects.

If the first similarity does not satisfy a second set value s2 in a state where the first similarity does not satisfy the first set value s1, the determination unit 170 may set an allowable range of the second similarity to a first range of 0 to m1. The above case may mean that the first similarity exists in a section of 0 to s2 in FIG. 14.

The determination unit 170 may determine the spliced portion as abnormal when the second similarity does not satisfy the first range of 0 to m1 in a state where the first similarity does not satisfy both the first set value s1 and the second set value s2.

If the first similarity satisfies the second set value s2 in a state where the first similarity does not satisfy the first set value s1, the determination unit 170 may set the allowable range of the second similarity to a second range of 0 to m2 smaller than the first range of 0 to m1. The above case may mean that the first similarity exists in the section of s2 to s1 in FIG. 14.

In the state in which the first similarity does not satisfy the first set value s1 and satisfies the second set value s2, when the second similarity does not satisfy the second range, the determination unit 170 may determine the spliced portion as abnormal.

From the above, it can be seen that there is a correlation in which the normal set range of the second similarity is adjusted depending on the value of the first similarity.

When the correlation occurs across two or more defect types, it may become increasingly difficult to numerically perform the determination on the normality or abnormality of the spliced portion.

Artificial intelligence may be used to determine the complex state of the spliced portion.

For example, the determination unit 170 may determine a specific defect as normal or abnormal by using machine-learned artificial intelligence. As an example, the determination unit 170 may analyze a correlation between a plurality of similarities analyzed by type using deep learning. The determination unit 170 may determine the presence or absence of an abnormality in the spliced portion based on the correlation.

For example, the determination unit 170 may determine the presence or absence of an abnormality in the spliced portion using a determination model.

The determination model may be machine-learned using learning data in which a plurality of similarities analyzed by type are taken as a problem and the presence or absence of an abnormality in a spliced portion is an answer.

Figure 15:
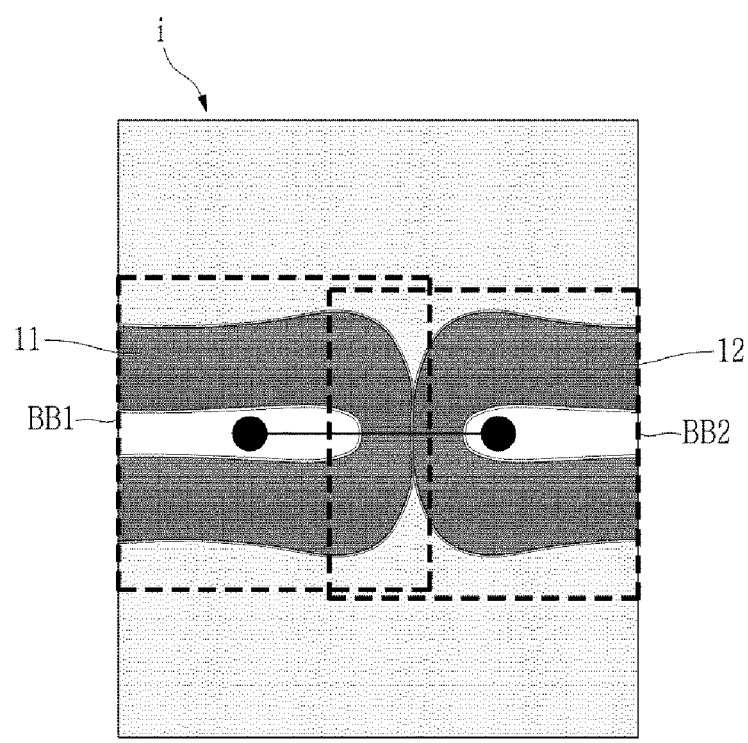
FIG. 15 is a schematic diagram illustrating other operations of the analysis unit and the determination unit.

FIG. 15 is a schematic diagram illustrating other operations of the analysis unit 150 and the determination unit 170.

The analysis unit 150 may analyze the geometric fusion-spliced state of the end of the first optical fiber 11 and the end of the second optical fiber 12 forming the spliced portion. The geometric fusion-spliced state may include the coordinates of the ends of the optical fibers, the angle between the optical fibers, and the like.

The determination unit 170 may determine the presence or absence of an abnormality in the spliced portion based on the fusion-spliced state.

For example, the analysis unit 150 may recognize the end of the first optical fiber 11 and the end of the second optical fiber 12 by applying a real-time object recognition technology such as the YOLO network. In addition, the analysis unit 150 may display a bounding box at the end of each recognized optical fiber. The analysis unit 150 may calculate a position of each bounding box and extract a median value of each bounding box.

The analysis unit 150 may recognize the optical fiber, specifically the bare fiber 15, as an object through machine learning for the fusion-spliced image. The analysis unit 150 may create a bounding box at the end of each optical fiber. Then, the determination unit 170 may determine the presence or absence of a geometrical abnormality in the spliced portion using the difference in the y-coordinate value included in the median value of each bounding box.

For example, the analysis unit 150 may acquire an image of an end portion including the end of the first optical fiber 11 and the end of the second optical fiber 12.

The analysis unit 150 may recognize the end of the first optical fiber 11 and the end of the second optical fiber 12 through the analysis of the end portion image.

The analysis unit 150 may generate a first bounding box BB1 including the end of the first optical fiber 11.

The analysis unit 150 may generate a second bounding box BB2 including the end of the second optical fiber 12.

The determination unit 170 may analyze the fusion-spliced state by using a difference between the center coordinates of the first bounding box BB1 and the center coordinates of the second bounding box BB2. The determination unit 170 may determine the presence or absence of an abnormality in the spliced portion based on the analysis result.

According to the verification apparatus described above, the work server 100 provided separately from the splicer for performing the splicing operation of the optical line 10 may be provided.

The work server 100 may include an acquisition unit 110, an analysis unit 150, and a determination unit 170.

The acquisition unit 110 may obtain splice data including a photographed image of the optical line 10 for which the splicing operation is completed from the splicer 90. In addition to the photographed image, the splice data may further include at least one of a splice loss rate, identification information of the splicer 90, identification information of the optical line 10, worker information, work date, work time, cut angle, core angle, core offset, and work mode.

The analysis unit 150 may analyze the splice data.

The determination unit 170 may determine the presence or absence of an abnormality in the spliced portion of the optical line 10 by using the analysis result of the splice data.

The determination unit 170 may transmit a rework message instructing rework to the terminal 80 of the worker who operates the splicer 90 or the splicer 90 when the spliced portion is determined as abnormal.

When it is determined that the spliced portion is normal, the determination unit 170 may transmit a completion message indicating completion of the splicing operation to the management server 200 that manages the optical line 10. In addition, the determination unit 170 may additionally transmit the completion message to the terminal 80 of the worker or the splicer 90. When recognizing the completion message, the worker can leave the current work place and move to another place.

Figure 16:
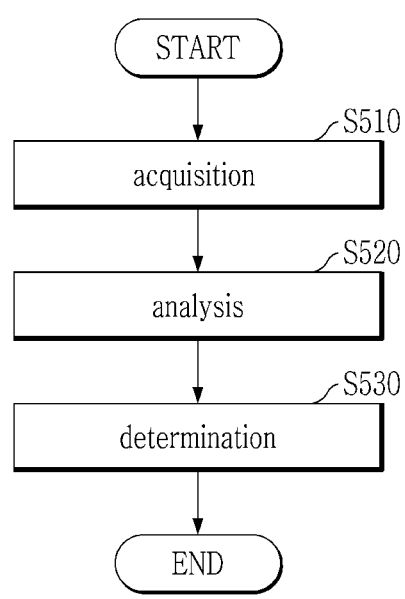
FIG. 16 is a flowchart illustrating a verification method according to one embodiment of the present disclosure.

FIG. 16 is a flowchart illustrating a verification method according to one embodiment of the present disclosure.

The verification method of FIG. 16 may be performed by the verification apparatus or the work server 100 of FIG. 1 or 2.

The verification method may include an acquisition step (S510), an analysis step (S520), and a determination step (S530).

In the acquiring step (S510), a photographed image of the optical line 10 for which the splicing operation is completed may be acquired. The acquiring step (S510) may be performed by the acquiring unit 110.

In the analysis step (S520), the defects of the spliced portion of the optical line 10 may be extracted by type through the analysis of the image. The analysis step (S520) may be performed by the analysis unit 150.

In the determining step (S530), it is possible to determine the presence or absence of an abnormality in the spliced portion based on the correlation of defects extracted by type. The determination step (S530) may be performed by the determination unit 170.

Figure 17:
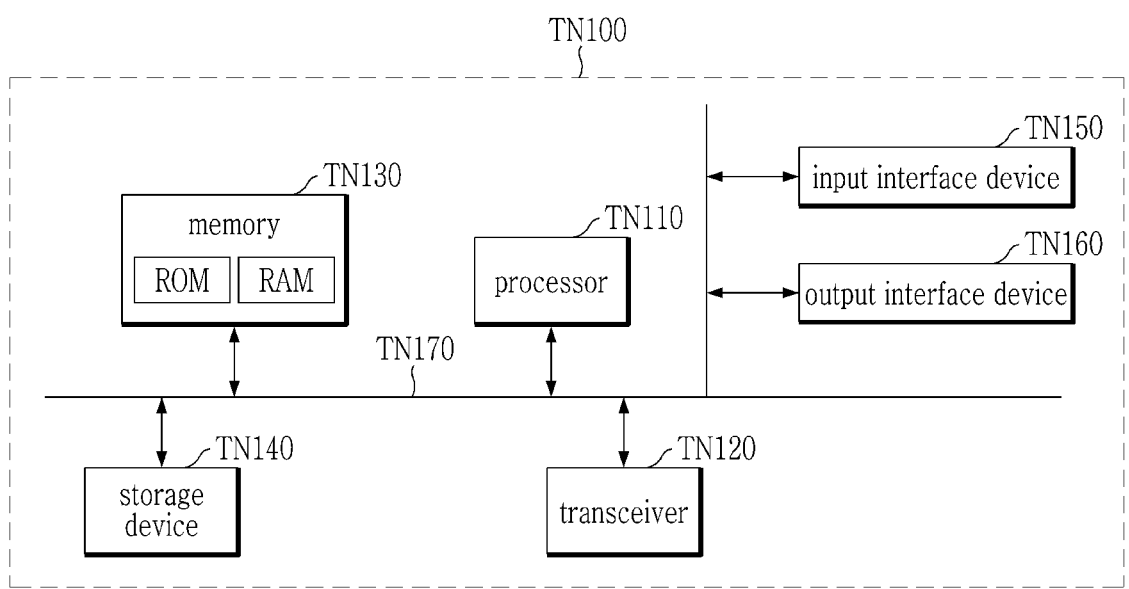
FIG. 17 is a diagram illustrating a computing device according to one embodiment of the present disclosure.

FIG. 17 is a diagram illustrating a computing device according to one embodiment of the present disclosure. The computing device TN100 in FIG. 17 may be a device (e.g., a verification apparatus, etc.) described herein.

In the embodiment of FIG. 17, the computing device TN100 may include at least one processor TN110, a transceiver TN120, and a memory TN130. In addition, the computing device TN100 may further include a storage device TN140, an input interface device TN150, an output interface device TN160, and the like. The components included in the computing device TN100 may be connected through a bus TN170 to communicate with each other.

The processor TN110 may execute program commands stored in at least one of the memory TN130 and the storage device TN140. The processor TN110 may mean a central processing unit (CPU), a graphics processing unit (GPU), or a dedicated processor for executing the method according to one embodiment of the present disclosure. The processor TN110 may be configured to implement procedures, functions, and methods described in connection with one embodiment of the present disclosure. The processor TN110 may control each component of the computing device TN100.

Each of the memory TN130 and the storage device TN140 may store various information related to the operation of the processor TN110. Each of the memory TN130 and the storage device TN140 may be configured as at least one of a volatile storage medium and a non-volatile storage medium. For example, the memory TN130 may include at least one of a read only memory (ROM) and a random access memory (RAM).

The transceiver TN120 may transmit or receive a wired signal or a wireless signal. The transceiver TN120 may be connected to a network to perform communication.

Meanwhile, the embodiment of the present disclosure is implemented not only through the apparatus and/or the method described above, but also through a program for realizing a function corresponding to the configuration of the embodiment of the present disclosure or a recording medium in which the program is recorded. Further, such an implementation may be easily implemented by those skilled in the art from the descriptions of the above-described embodiments.

Although the embodiments of the present disclosure have been described in detail above, the scope of the present disclosure is not limited thereto, and various modifications and improvements by those skilled in the art using the basic concept of the present disclosure as defined in the following claims also belong to the scope of the present disclosure.

| [Detailed Description of Main Elements] | |
| --- | --- |
| 10: optical line | 11: first optical fiber |
| 12: second optical fiber | 15: bare fiber |
| 17: jacket | 19: core |
| 18: clad | 80: terminal |
| 90: splicer | 91: body part |
| 92: guide part | 93: splicing unit |
| 94: receiving groove | 95: cover part |
| 96: hinge | 97: photographing unit |
| 98: providing unit | 100: work server |
| 110: acquisition unit | 130: pre-processing unit |
| 150: analysis unit | 170: determination unit |
| 200: management server | |

What is claimed is:

1. A verification apparatus comprising:
an acquisition unit configured to acquire a photographed image of an optical line for which a splicing operation is completed;
an analysis unit configured to:

extract a defect of a spliced portion of the optical line through analysis of the image; and analyze a similarity between each of defect images stored by type in a database and the image acquired by the acquisition unit; and a determination unit configured to:
analyze a correlation between a plurality of similarities analyzed by type using deep learning; and
determine the presence or absence of an abnormality in the spliced portion based on the correlation.

2. The verification apparatus of claim 1, further comprising a splicer including a body part, a guide part, a splicing unit, a cover part, a photographing unit, and a providing unit, wherein the body part is formed in a three-dimensional shape, wherein the guide part and the splicing unit are formed on one surface of the body part, wherein the guide part serves to align a first optical fiber and a second optical fiber so that an end of the first optical fiber and an end of the second optical fiber face each other, wherein the splicing unit serves to splice the end of the first optical fiber and the end of the second optical fiber aligned to face each other by the guide part, wherein the cover part is rotatably installed at the body part, and opens or covers the guide part and the splicing unit through the rotation, wherein the photographing unit is provided on an inner surface of the cover part facing the splicing unit or on one surface of the body part facing the inner surface of the cover part, in a closed state in which the cover part covers the guide part and the splicing unit, wherein the photographing unit photographs the end of the first optical fiber and the end of the second optical fiber, which become the spliced portion of the optical line, in the closed or an open state, wherein the providing unit communicates with the acquisition unit through a wired/wireless communication network, wherein the acquisition unit is provided in a server formed separately from the splicer performing the joining operation and is configured to receive an image of the spliced portion photographed by the photographing unit from the providing unit.

3. The verification apparatus of claim 1, wherein
the acquisition unit is configured to acquire an image of a first resolution,
the image of the first resolution is an image photographing a bare fiber exposed to the outside which includes a core and a clad of the optical line,
the image of the first resolution includes a spliced portion of the bare fiber, wherein the verification apparatus further comprises:
a pre-processing unit configured to process the image of the first resolution is provided, wherein
the pre-processing unit is configured to resize the image of the first resolution to a second resolution higher than the first resolution,
the pre-processing unit is configured to extract only a region of the core in which the clad is excluded from the image of the second resolution, and
the analysis unit is configured to analyze the region of the core extracted by the pre-processing unit, and extracts the defect through the analysis.

4. The verification apparatus of claim 3, wherein the pre-processing unit or the analysis unit is configured to generate an enlarged image in which the spliced portion in the region of the core is cropped and enlarged, and
the analysis unit is configured to extract the defect through the analysis of the enlarged image.

5. The verification apparatus of claim 1, wherein
the analysis unit is configured to generate a current hash value of the image, and
the analysis unit is configured to extract the defect of the spliced portion by comparing a defect hash value stored in a database with the current hash value.

6. The verification apparatus of claim 1, wherein
when different set ranges are set by type of defect,
the determination unit is configured to determine whether a similarity analyzed for each type satisfies a set range for the corresponding type, and
the determination unit is configured to determine the spliced portion as normal only when the similarities analyzed by type satisfy the set ranges for each type, respectively.

7. The verification apparatus of claim 1, wherein
the determination unit is configured to determine the presence or absence of an abnormality in the spliced portion using a determination model, and
the determination model is machine-learned using learning data in which a plurality of similarities analyzed by type are taken as a problem and the presence or absence of an abnormality in the spliced portion is an answer.

8. The verification apparatus of claim 1, wherein
the determination unit is configured to analyze a correlation between a plurality of similarities analyzed by type,
the determination unit is configured to adjust a limit value of a set range for each type of defect using the correlation,
the determination unit is configured to determine the presence or absence of an abnormality in the spliced portion depending on whether the similarity analyzed for each type satisfies the set range for the corresponding type.

9. The verification apparatus of claim 1, wherein
the analysis unit is configured to analyze a first similarity between a first type of defect image and the image acquired by the acquisition unit,
the analysis unit is configured to analyze a second similarity between a second type of defect image and the image acquired by the acquisition unit,
the determination unit is configured to determine the spliced portion as abnormal regardless of the second similarity when the first similarity satisfies a first set value,
the determination unit is configured to set an allowable range of the second similarity to a first range when the first similarity does not satisfy a second set value in a state where the first similarity does not satisfy the first set value,
the determination unit is configured to determine the spliced portion as abnormal when the second similarity does not satisfy the first range in a state where the first similarity does not satisfy both the first set value and the second set value,
the determination unit is configured to set the allowable range of the second similarity to a second range that is smaller than the first range when the first similarity satisfies the second set value in a state where the first similarity does not satisfy the first set value, and the determination unit is configured to determine the spliced portion as abnormal when the second similarity does not satisfy the second range in a state where the first similarity does not satisfy the first set value and satisfies the second set value.

10. The verification apparatus of claim 1, wherein
the analysis unit is configured to analyze a geometric fusion-spliced state of an end of a first optical fiber and an end of a second optical fiber forming the spliced portion,
the determination unit is configured to determine the presence or absence of an abnormality in the spliced portion based on the fusion-spliced state.

11. The verification apparatus of claim 10, wherein
the analysis unit is configured to acquire an image of an end portion including the end of the first optical fiber and the end of the second optical fiber,
the analysis unit is configured to recognize the end of the first optical fiber and the end of the second optical fiber through the analysis of the end portion image,
the analysis unit is configured to generate a first bounding box including the end of the first optical fiber,
the analysis unit is configured to generate a second bounding box including the end of the second optical fiber, and
the determination unit is configured to analyze the fusion-spliced state using a difference between center coordinates of the first bounding box and center coordinates of the second bounding box.

12. A verification apparatus comprising:
a work server formed separately from a splicer for performing a splicing operation for an optical line,
wherein the server includes an acquisition unit, an analysis unit, and a determination unit,
the acquisition unit is configured to obtain splice data including a photographed image of the optical line for which the splicing operation is completed from the splicer,
the analysis unit is configured to analyze the splice data by:
extracting a defect of a spliced portion of the optical line through analysis of the splice data; and
analyzing a similarity between each of defect images stored by type in a database and the image acquired by the acquisition unit,
the determination unit is configured to use the analysis result of the splice data to:
analyze a correlation between a plurality of similarities analyzed by type using deep learning; and
determine the presence or absence of an abnormality in the spliced portion based on the correlation,
the determination unit is configured to transmit a rework message instructing rework to a terminal of a worker who operates the splicer or the splicer when the spliced portion is determined as abnormal, and
the determination unit is configured to transmit a completion message indicating completion of the splicing operation to a management server that manages the optical line when it is determined that the spliced portion is normal.

13. A verification method which is performed by a verification apparatus, the method comprising:
acquiring a photographed image of an optical line for which a splicing operation is completed;
extracting defects of a spliced portion of the optical line by type through analysis of the image;
analyzing a similarity between each of defect images stored by type in a database and the acquired image;
analyzing a correlation between a plurality of similarities analyzed by type using deep learning; and
determining the presence or absence of an abnormality in the spliced portion based on the correlation.

* * * * *